Dec. 5, 1939.  J. C. GAULD  2,182,627
OVERLOAD RELEASE CLUTCH
Filed March 18, 1935  2 Sheets-Sheet 1
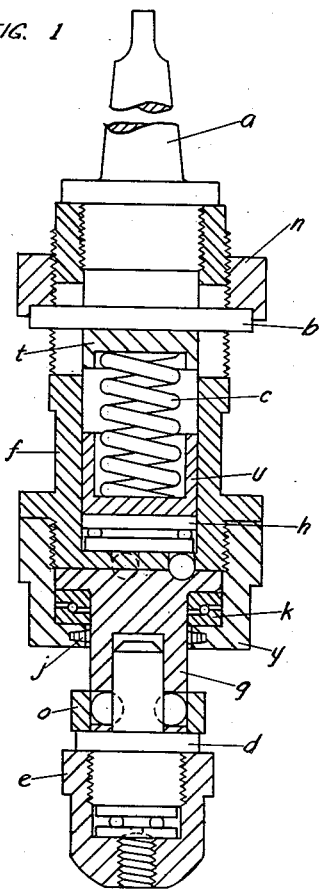
FIG. 1
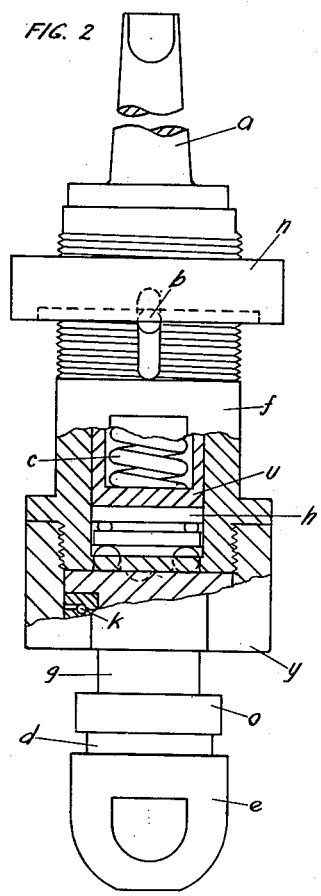
FIG. 2
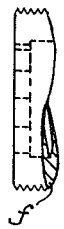
FIG. 3
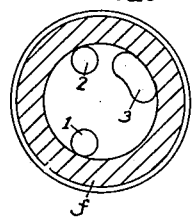
FIG. 3ª
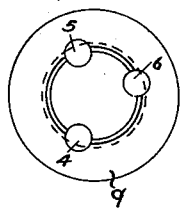
FIG. 4
FIG. 4ª
Inventor
James Cowper Gauld Dec. 5, 1939.   J. C. GAULD   2,182,627
OVERLOAD RELEASE CLUTCH
Filed March 18, 1935   2 Sheets-Sheet 2
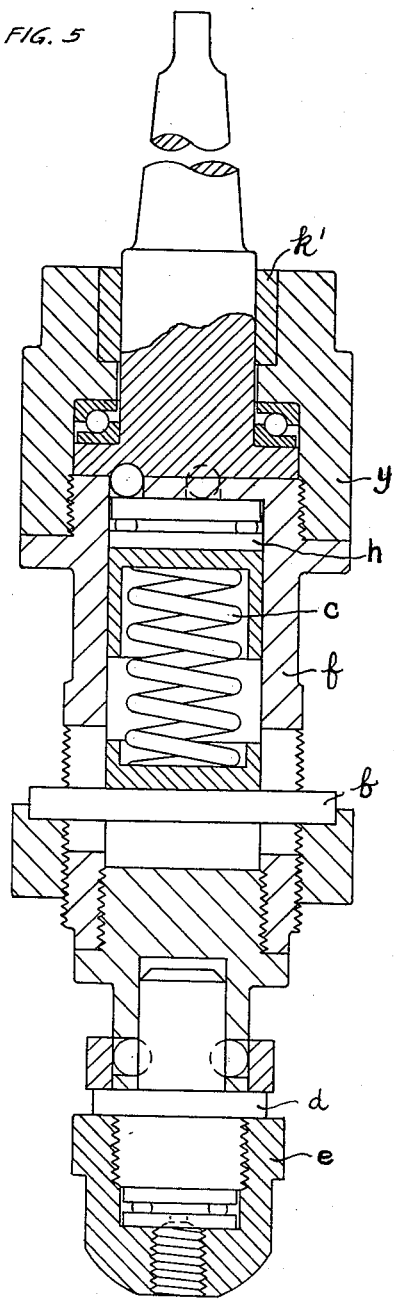
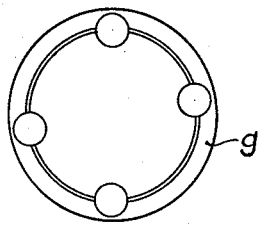
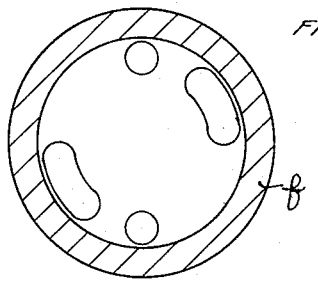
Inventor
James Cowper Gauld Patented Dec. 5, 1939

2,182,627

UNITED STATES PATENT OFFICE 2,182,627

OVERLOAD RELEASE CLUTCH

James Cowper Gauld, New Brunswick, N. J.

Application March 18, 1935, Serial No. 11,607
In Great Britain April 13, 1934

5 Claims. (Cl. 192—56)

This invention relates to clutch mechanism of a type commonly used in conjunction with chucks when tapping screw threads, tightening set screws and nuts, and driving or setting studs in machine parts and the like. For example: In driving a stud in a machine part with a positive drive clutch, it is necessary, in order to avoid breakage of the stud, that the driving effort or force be discontinued or disconnected the moment the stud is driven home.

What I believe to be new in a clutch of this type, and the special feature claimed for it, is a form of overload clutch whereby automatic clutching and declutching of the principal members of the device, together with provision for the free overrunning of one member relative to the other member in a given direction, is accomplished, simply and directly, by a number of balls in constant engagement with one member and in releasable engagement with the other member, without having resource to supplementary mechanism excepting the necessary axial pressure means required.

I will now refer to the drawings illustrating the improvements I wish to claim.

In Fig. 1, which is mainly a sectional view, the chuck is shown completely assembled, with the clutch in the engaged position. In Fig. 2, the clutch is shown in the disengaged position. Figs. 3 and 3a are separate views of the bottom of cylinder $f$ as it would appear if cut off flush with the bottom of the bore, and show the relative positions of the two holes and the slot therein. Figs. 4 and 4a are separate views of part $g$, and show the relative positions of the three spherical recesses on the surface of $g$, and a shallow ball race at the recess pitch circle. Figs. 5, 6 and 7 show views of an alternative design which will be referred to later.

For convenience, the two holes and the arcuate slot in the bottom of cylinder $f$ are numbered 1, 2 and 3, respectively, and the three spherical recesses in $g$ are also numbered 4, 5 and 6, respectively. They are shown unequally spaced or pitched on their respective circles, which are equal in diameter, but if $f$ is superimposed on $g$ so that their pitch circles coincide, and hole 1 coincides with recess 4, then hole 2 will coincide with recess 5, and the end of arcuate slot 3 furthest from hole 2 will coincide with recess 6. Three balls contacting the spherical recesses 4, 5 and 6 project through holes 1, 2, and slot 3, respectively, see Fig. 1 and are held in this position under pressure of the spring $c$ acting through ball bearing $h$, which is free to rotate and also to move longitudinally in cylinder $f$. The ball race circle in thrust bearing $h$ proper exceeds in diameter the shallow ball race on face of $g$. With the balls in this position the cylinder $f$ is locked with part $g$, which is freely supported in part $y$ by semi-thrust bearing $k$. Part $y$ is secured to and locked with cylinder $f$. As the stud holder $e$, secured to its shank $d$, is also locked to $g$, the chuck will now revolve as a unit.

In operation, when the driving force exerted by $f$ and transmitted to $g$ by means of the balls in recesses 4 and 5 exceeds a predetermined amount, which is governed by the spring $c$, the balls in 4 and 5 will be forced out of their recesses, and $f$ can then rotate without transmitting its rotation to $g$ which is freely supported by ball bearing $k$. Part $g$ now being stationary, on the further clockwise rotation of cylinder $f$ the end of slot 3 nearest to hole 2 will contact with the ball carried around in slot 3. It will be evident that the balls driven round by $f$ in holes 1, 2, and slot 3 will not now all coincide with the recesses 4, 5 and 6 at the same moment, as when holes 1 and 2 again coincide with recesses 4 and 5 the ball carried by slot 3 is at the end of slot 3 which does not coincide with recess 6. As a consequence, there is now always at least one ball on the surface of $g$ to prevent $f$ and $g$ from becoming locked. To make certain that the ball in slot 3 will take and maintain its required position in the slot, it may be very slightly larger than the balls in holes 1 and 2. This very slight increase in size will not be enough to give it any effective driving force when passing the recesses in $g$. When the rotation of $f$ is reversed, the ball in slot 3 will again take the position at the end of slot 3, which coincides with recess 6 when holes 1 and 2 coincide with recesses 4 and 5, respectively, and the spring $c$ will again come into action and by its pressure hold the balls in the locked position. The rotation of the stud holder $e$ being thus reversed, it is disengaged from the stud being driven, and the operation can then be repeated.

In the foregoing description the cylinder $f$ is depicted as the driving member and part $g$ as the driven member, but with a slight modification in design the part $g$ may become the driving member and cylinder $f$ the driven member. To carry out this modification the shank $a$ would be removed from cylinder $f$ and would be replaced by a suitable adapter affixed to $f$ and designed to receive shank $d$ in precisely the same manner as shown in $g$. Part $g$ instead of being designed to receive shank $d$ as shown, would be designed in combination with a shank similar to $a$, and in operation the part g would now become the driving member and cylinder f, now carrying the stud holder, the driven member of the safety clutch incorporated in this chuck. This modification is illustrated by Fig. 5.

Parts t and u in Figs. 1 and 2 act as guide pistons for spring c, and by means of nut n, acting through pin b, the pressure of the spring c may be varied. Suitable index markings for regulating the pressure may be provided for nut n; j indicates a lubricant retainer. By modifying the design a supplementary bearing of any convenient type or construction may be added to y as an additional support for g. This modification is also illustrated by Fig. 5, part k. The shank a, secured and locked to cylinder f, may be of any convenient type. The shank d may also be of any convenient design with the socket in g designed to accommodate d which in this design is held in position by a loose release collar o and is convenient for the rapid interchange of holders accommodating different size studs and the like. As the construction shown for both shanks is already well-known, they need not be further described.

The mechanism to which I particularly lay claim consists in the means disclosed for securing automatic control of the balls housed in the ball carrying member, this said means consisting of so shaping the apertures in the ball carrying member that on rotation of the driving member relative to the driven member the balls are constrained either to remain out of common register with the spherical recesses in the member opposed to the ball carrying member, and hence out of engagement therewith, or to simultaneously match with and engage the spherical recesses according to the direction of relative rotation. It will be understood that although the novel features claimed for this clutch have been described and illustrated by the employment of three balls, its possible construction may be varied by the employment of two, or more than three the distance of each individual aperture from the centre of rotation as well as the number thereof and their angular distance apart being a matter of design and subject to variation. By means of Figs. 6 and 7, one alternative arrangement of spherical recesses and corresponding apertures is shown.

It will also be evident that although this clutch is described and illustrated as a useful form of chuck mechanism, for which it is specially suitable, it can without further invention be adapted to many other uses; therefore, the claims are not restricted to its use in this particular form.

What I claim is:
1. In a clutch of the character described; a driving member and a driven member mounted on a common axis each with flange faces adjacent and the members secured against relative axial movement but capable of relative rotation with a minimum of friction, a number of balls housed in apertures in the flange of one member and movable axially therethrough, adjustable pressure means consisting of spring means mounted to produce an axial thrust on the balls and press them to the flange face of the other member which is provided with spherical recesses to engage the balls and, slotted aperture means providing for an automatic relative shift in position of the balls housed in the ball carrying member.

2. In a clutch of the character described; two cooperating coaxial members, one, which may be either one, adapted as a driving member and the other adapted as a driven member, both members with flange faces held in constant juxtaposition, a number of apertures provided in the flange of one member, each aperture housing a ball which projects therethrough, means providing for a limited shift in the relative angular position of the balls housed in the apertures, and in conjunction with the above means an axially movable antifriction bearing under continual axial pressure transmitted by spring means suitably mounted for adjustment of the pressure, this bearing in turn transmitting this pressure to the balls which are also movable axially and ride between the bearing and the flange face of the other member, spherical recesses provided on the face of this other member positioned to simultaneously match with and engage the balls at a position reached on rotation of one member relative to the other member in a given direction, thereby interlocking the members for rotation as a unit, but characterised in that on rotation as a unit in the forward or opposite direction whenever an excess of torque overcomes the aforementioned axial pressure the driving member may freely overrun the driven member due to an automatic shift in the relative angular position of the balls which prevents their simultaneous engagement with the spherical recesses.

3. In a clutch of the character described, two coacting coaxial members each with flange faces held in constant juxtaposition but capable of relative rotation, a plurality of spherical recesses on the flange face of one member, an equal number of apertures through the flange face of the other member characterized in that one of the apertures is elongated in an arcuate direction to a greater degree than the remaining aperture or apertures, a ball housed in each aperture and yieldable pressure means acting on the balls in an axial direction.

4. In a clutch of the character described, two coacting coaxial members each with flange faces held in constant juxtaposition but capable of relative rotation, a plurality of spherical recesses on the flange face of one member, an equal number of apertures through the flange face of the other member characterized in that certain designated apertures are elongated in an arcuate direction to a greater degree than the remaining apertures, a ball housed in each aperture and yieldable pressure means acting on the balls in an axial direction.

5. In a clutch of the character described, a driving member, a driven member coaxial with the driving member, means for automatically interlocking the driving and driven members by a plurality of balls in constant engagement with one of the above members but in releasable engagement with the other member, and means for automatically altering the relative angular distance between certain balls to prevent interlocking of the members when the driving member is released from the driven member by the occurrence of an overload.

JAMES COWPER GAULD.